US008856680B2

(12) United States Patent
Jung

(10) Patent No.: US 8,856,680 B2
(45) Date of Patent: Oct. 7, 2014

(54) MOBILE COMMUNICATION TERMINAL AND METHOD FOR CONTROLLING A BACKGROUND TASK

(75) Inventor: Jaehee Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1642 days.

(21) Appl. No.: 11/782,518

(22) Filed: Jul. 24, 2007

(65) Prior Publication Data

US 2008/0022279 A1    Jan. 24, 2008

(30) Foreign Application Priority Data

Jul. 24, 2006  (KR) ........................ 10-2006-0068951

(51) Int. Cl.
  *G06F 3/00*    (2006.01)
  *G06F 3/048*   (2013.01)
  *G06F 9/44*    (2006.01)
  *H04M 1/725*   (2006.01)
(52) U.S. Cl.
  CPC ......... *G06F 9/4443* (2013.01); *H04M 1/72544* (2013.01)
  USPC ............................ 715/794; 715/718; 715/768
(58) Field of Classification Search
  CPC .. H04L 67/306; H04M 1/72522; G06F 9/485; G06F 9/4443
  USPC ......... 715/864, 790–797, 808, 811, 716–726, 715/766, 768
  See application file for complete search history.

(56) References Cited

U.S. PATENT DOCUMENTS

| | | | | |
|---|---|---|---|---|
| 5,659,693 A * | 8/1997 | Hansen et al. | ................ | 715/779 |
| 6,037,937 A * | 3/2000 | Beaton et al. | ................ | 715/764 |
| 6,917,373 B2 * | 7/2005 | Vong et al. | ................ | 715/840 |
| 7,103,387 B2 * | 9/2006 | Seo | ................ | 455/566 |
| 7,123,945 B2 * | 10/2006 | Kokubo | ................ | 455/566 |
| 7,415,352 B2 * | 8/2008 | Olcott | ................ | 701/211 |
| 7,526,585 B2 * | 4/2009 | Jeong | ................ | 710/72 |
| 7,533,342 B1 * | 5/2009 | Vialle et al. | ................ | 715/717 |
| 7,676,767 B2 * | 3/2010 | Hofmeister et al. | ........ | 715/863 |
| 8,365,098 B2 * | 1/2013 | Won et al. | ................ | 715/847 |
| 8,483,765 B2 * | 7/2013 | Cho | ................ | 455/566 |
| 2002/0135615 A1 * | 9/2002 | Lang | ................ | 345/764 |
| 2004/0142720 A1 * | 7/2004 | Smethers | ................ | 455/550.1 |

(Continued)

FOREIGN PATENT DOCUMENTS

KR    1020060073664    6/2006

OTHER PUBLICATIONS

Miller, "Microsoft Windows XP for Home Users: Service Pack 2 Edition", published Jul. 17, 2005, copyright Peachpit Press 2006, pp. 225-226.*

(Continued)

*Primary Examiner* — Omar Abdul-Ali
*Assistant Examiner* — Andrew Tank
(74) *Attorney, Agent, or Firm* — Lee, Hong, Degerman, Kang & Waimey

(57) ABSTRACT

A mobile communication terminal and a method for controlling a background task is disclosed that can increase user convenience by controlling the background task simply. The method includes running foreground and background tasks simultaneously by a multitasking operation; inputting a selection key to directly call a task setting window for setting a specific operation of the background task; displaying the task setting window on a foreground screen that corresponds to the selection key that was input; and setting the specific operation using displayed task setting window.

30 Claims, 7 Drawing Sheets

(56) References Cited

U.S. PATENT DOCUMENTS

| | | | |
|---|---|---|---|
| 2005/0102631 A1* | 5/2005 | Andreas et al. | 715/772 |
| 2006/0101350 A1* | 5/2006 | Scott | 715/779 |
| 2006/0123353 A1* | 6/2006 | Matthews et al. | 715/779 |
| 2006/0258406 A1* | 11/2006 | Igarashi et al. | 455/567 |
| 2007/0061806 A1* | 3/2007 | Jeong | 718/100 |
| 2007/0157094 A1* | 7/2007 | Lemay et al. | 715/717 |
| 2010/0169357 A1* | 7/2010 | Ingrassia et al. | 707/769 |
| 2010/0287507 A1* | 11/2010 | Paquette et al. | 715/827 |

OTHER PUBLICATIONS

MP3VCR.com, http://www.mp3vcr.com/playback.html, Jan. 13, 2005, as evidenced by The Internet Archive at http://web.archive.org/web/20050113100437/http://www.mp3vcr.com/playback.html.*

* cited by examiner

MOBILE COMMUNICATION TERMINAL AND METHOD FOR CONTROLLING A BACKGROUND TASK

CROSS-REFERENCE TO RELATED APPLICATIONS

Pursuant to 35 U.S.C. §119(a), this application claims the benefit of earlier filing date and right of priority to Korean Application No. 2006-0068951, filed on Jul. 24, 2006, the contents of which are hereby incorporated by reference herein in its entirety.

FIELD OF THE INVENTION

This invention is directed to a mobile communication terminal that can control a background task and more particularly, a mobile communication terminal and a method for controlling the background task in a mobile communication terminal.

DESCRIPTION OF THE RELATED ART

Many people enjoy music using a MPEG Audio Layer-3 (MP3) phone having a MP3 function. Performance of the MP3 phone is influenced by memory capacity, sound quality, and multitasking.

Recently, an MP3 phone having an MP3 function that is not inferior to that of an MP3 player has been introduced. These MP3 phones are large-capacity smart phones having a music function.

Each of the presently released MP3 phones is equipped with a multitasking function. The multitasking function allows a user to send text messages or play a game while listening to music. The multitasking function allows selection of a background music (BGM) function while the game is played and simultaneously allows the sending of text messages or playing a game using a multitasking key or a menu key.

In conventional phones, a user must control a background program through a complex process in a multitasking environment. For example, if the user desires to change a setting of a player for background music, the user must move to a music play menu using a multitasking key or a menu key. Accordingly, there is a problem in that the user is inconvenienced because the background music function requires complex processes.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method for controlling a background task in a mobile communication terminal is provided. The method includes running a foreground task and the background task in a multitasking environment, entering a selection key, the selection key selecting a task setting window for setting at least one specific operation of the background task, displaying the task setting window that corresponds to the selection key on a foreground screen of a display and setting the at least one specific operation of the background task according to information entered via the displayed task setting window.

It is contemplated that the background task is one of background music (BGM) and checking SMS messages, MMS messages or E-mail messages. It is further contemplated that the foreground task is one of an image viewer, SMS messages, MMS messages, E-mail messages, a wireless application protocol (WAP) browser, a personal information management system (PIMS), a game program, a wireless internet connection program and a camera photographing program.

It is contemplated that the method further includes re-entering the selection key when setting the at least one specific operation of the background task is completed and removing the task setting window from the foreground screen. It is further contemplated that entering the selection key includes pressing at least two buttons at the same time.

It is contemplated that the at least two buttons include a function key button and a special key button. It is further contemplated that the function key button is a side button key.

It is contemplated that the entering the selection key includes pressing a specific single button. It is further contemplated that entering the selection key includes pressing a hot key for more than a predetermined time.

It is contemplated that displaying the task setting window includes displaying a semi-transparent window on the foreground screen. It is further contemplated that displaying the task setting window includes displaying a popup window on the foreground screen.

In another aspect of the present invention, a method for controlling background music (BGM) in a mobile communication terminal is provided. The method includes running a foreground task and a BGM task in a multitasking environment, entering a selection key, the selection key selecting a control skin for setting at least one specific operation of the BGM task, displaying the control skin that corresponds to the selection key on a foreground screen of a display and setting the at least one specific operation of the BGM task according to information entered via the displayed control skin.

It is contemplated that the foreground task is one of an image viewer, SMS messages, MMS messages, E-mail messages, a wireless application protocol (WAP) browser, a personal information management system (PIMS), a game program, a wireless internet connection program and a camera photographing program. It is further contemplated that the method further includes re-entering the selection key when setting the at least one specific operation of the BGM task is completed and removing the control skin from the foreground screen.

It is contemplated that displaying the control skin includes displaying a semi-transparent window on the foreground screen. It is further contemplated that displaying the control skin includes displaying a popup window on the foreground screen. Preferably, the at least one specific operation of the BGM task includes at least one of a Play function, a Pause function, a Fast Forward (FF) function, a Rewind (REW) function, a Volume function and a Stereo/Mono function.

In another aspect of the present invention, a mobile communication terminal for controlling a background task is provided. The terminal includes a background module running the background task in a multitasking environment in which a foreground task is run, an input device configured to enter a selection key, the selection key selecting a task setting window for setting at least one specific operation of the background task, a display device configured to display information related to the foreground task and the background task and a controller configured to control the display device such that the task setting window that corresponds to the selection key is displayed on a foreground screen and to control the background module to set the at least one specific operation of the background task according to information entered via the displayed task setting window.

It is contemplated that the background task is one of background music (BGM) and checking SMS messages, MMS messages or E-mail messages. It is further contemplated that the foreground task is one of an image viewer, SMS messages, MMS messages, E-mail messages, a wireless application protocol (WAP) browser, a personal information management system (PIMS), a game program, a wireless internet connection program and a camera photographing program, It is contemplated that the controller is further configured to control the display device such that the task setting window is removed from the foreground screen when the selection key is re-entered after setting the at least one specific operation of the background task is completed. It is further contemplated that the controller is further configured to recognize the selection key upon a hot key of the input device being pressed for more than a predetermined time.

It is contemplated that the controller is further configured to recognize the selection key upon at least two buttons of the input device being pressed at the same time. It is further contemplated that the at least two buttons include a function key button and a special key button. Preferably, the function button is a side button key.

It is contemplated that the controller is further configured to control the display device such that the task setting window is displayed as a semi-transparent window on the foreground screen. It is further contemplated that the controller is further configured to control the display device such that the task setting window is displayed as a popup window on the foreground screen.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
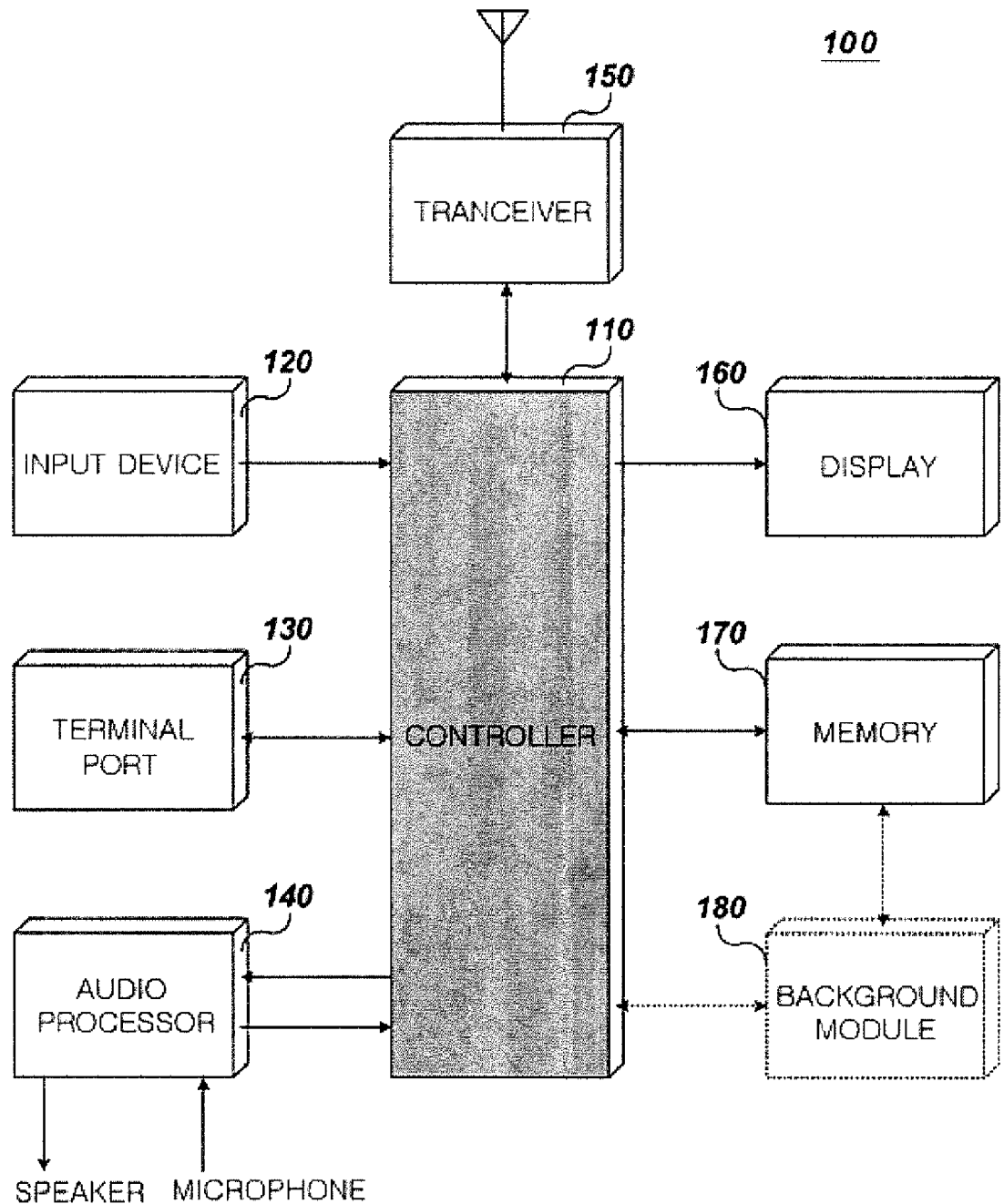
FIG. 1 is a schematic diagram illustrating a mobile communication terminal that runs a background task according to an embodiment of the present invention.

Exemplary embodiments of the present invention will be described in detail with reference to the accompanying drawings. The aspects and features of the present invention and methods for achieving the aspects and features will be apparent by referring to the embodiments described in detail with reference to the accompanying drawings. However, the present invention is not limited to the disclosed embodiments and can be implemented in diverse forms.

The matters defined in the description, such as the detailed construction and elements, are nothing but specific details provided to assist those of ordinary skill in the art in a comprehensive understanding of the invention. The present invention is only defined within the scope of the appended claims. In the description of the present invention, the same drawing reference numerals are used for the same elements in various figures.

FIG. 1 is a schematic diagram illustrating a mobile communication terminal 100 that runs a background task according to an embodiment of the present invention. As illustrated in FIG. 1, the mobile communication terminal 100 includes a controller 110, an input device 120, a terminal port 130, an audio processor 140, a wireless transceiver 150, a display 160, a memory 170 and a background module 180. The mobile communication terminal 100 may be a personal digital assistant (PDA), a cellular phone, a personal communication service (PCS) phone, a global system for mobile (GSM) phone, a wideband CDMA (W-CDMA) phone, a CDMA-2000 phone or a mobile broadband system (MBS) phone.

A task for the background module 180 is run in the background of the mobile communication terminal 100 supporting multitasking. The task may be sending a check of SMS messages, MMS messages and E-mail messages or background music. However, the task is not limited to these functions.

The controller 110 controls various functions implemented in the mobile communication terminal 100 and processes various data and signals that are input from and output to other components. The controller 110 also controls the background module 180. For example, the controller 110 performs control so that a task setting window for the background module 180 is displayed in response to a user's input of a selection key and controls the background module according to the setting of the task setting window.

The memory 170 includes storage, such as a flash memory, a RAM, or an EEPROM, and stores software, such as an operating system (OS) software, application programs and game programs. The memory 170 may include at least one program memory and data memory. The program memory stores one or more programs for controlling a general operation of the mobile communication terminal 100.

The memory 170 stores a program for multitasking and a player control skin program set by a user. The background module 180 may be implemented with separate hardware or via a program that is stored in the memory 170.

The display 160 may be a Liquid Crystal Display (LCD), an Organic Light Emitting Diode (OLED) or a touch screen. The display 160 displays a menu screen that is selected by a user, a run screen for running according to the user's selection of the menu screen or a result screen. The display 160 also displays the task setting window of the background module in the foreground on which a foreground task is run in response to receiving a selection key input.

The foreground task may be selected from image viewers, SMS messages, MMS messages, E-mail messages, WAP browsers, a personal information management system, game programs, wireless internet connection programs and camera photographing programs. However, the foreground task is not limited to these functions.

The input device 120 includes numeral buttons (0 ... 9), special key buttons (*, #, ...), character key buttons indicating, for example, the Korean alphabet and English alphabet, and directional key buttons indicating direction. The input device 120 acts as an interface that provides a user's instruction to the controller 110.

The input device 120 may be implemented with a keypad, a jog dial, a touch screen or a joy stick. The input device 120 is used to input the selection key that directly calls the task setting window for the background module.

For example, when the user presses a specific key button, the input device 120 creates selection key data corresponding to the specific key button and sends the created key data to the controller 110. Specially, the function key enables the user to input commands in order to perform additional functions while performing an MP3 play function. The additional functions include SMS messages, MMS messages, WAP browsers, PIMS, a game function, a wireless Internet function or a photographing function.

The terminal port 130 is a terminal for connecting an external device. A joy stick or mouse that is used for moving a screen displayed on the display 160 may be connected to the terminal port 130.

The audio processor 140 is connected to a speaker and a microphone to process a bell sound or voice information. The mobile communication terminal 100 may also include a camera (not shown).

The wireless transceiver 150 performs a communication function of the mobile communication terminal. The wireless transceiver 150 includes an RF sender for up-converting and amplifying a frequency of a sending signal and an RF receiver for low-noise amplifying a received signal and down-converting a frequency of the received signal.

Figure 2:
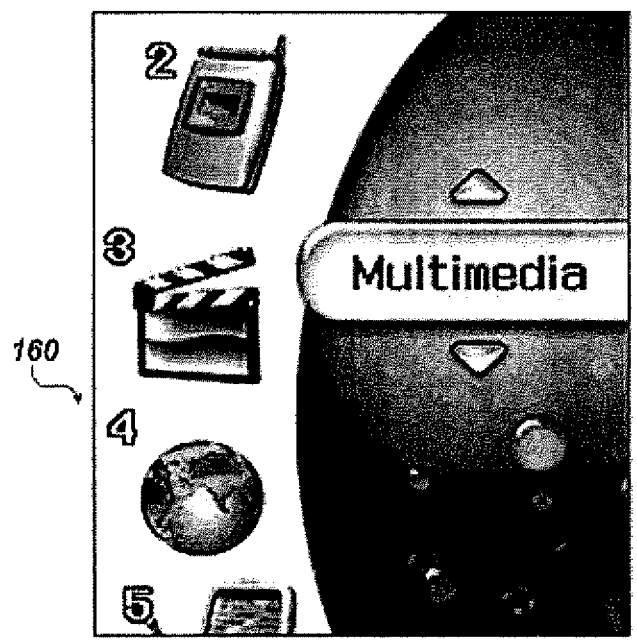
FIG. 2 is a diagram illustrating the external appearance of the mobile communication terminal illustrated in FIG. 1.
Figure 2:
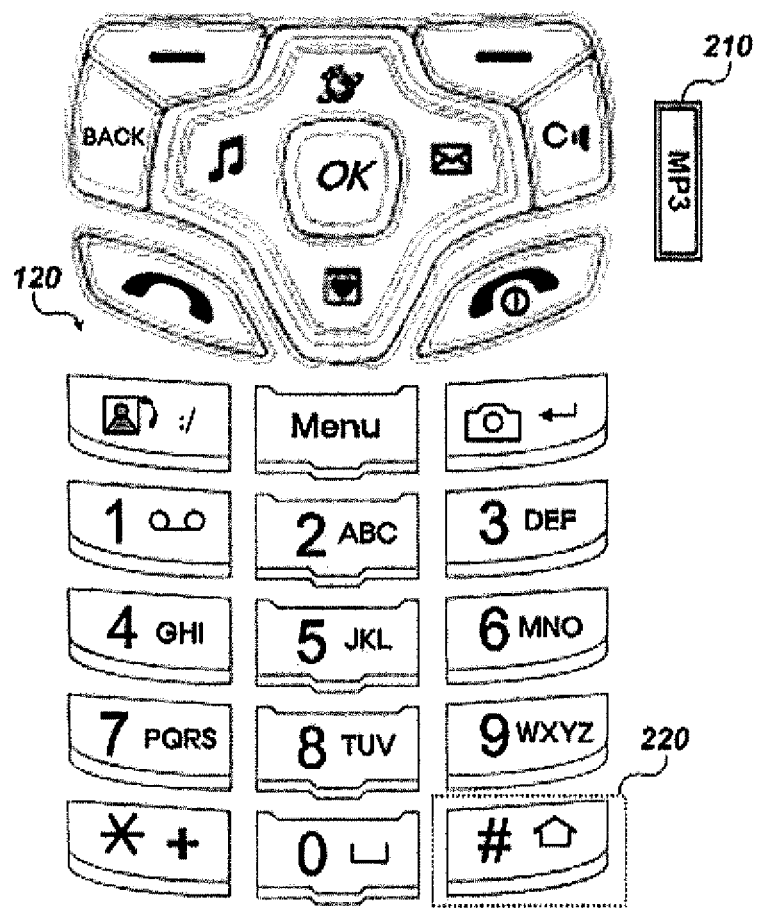

FIG. 2 is a diagram illustrating the external appearance of the mobile communication terminal 100 illustrated in FIG. 1. As illustrated in FIG. 2, the input device 120 and display 160 are located on external surfaces of the mobile communication terminal 100. The input device 120 may be a keypad and the display 160 may be a display screen. Additionally, directional buttons for moving contents displayed on the display screen and a side button may also be located on an external surface of the mobile communication terminal 100.

The side button is a function key provided on one side of the mobile communication terminal 100 and may be an MP3 button 210, as illustrated in FIG. 2. If the MP3 button 210 is pressed, the communication terminal enters a background mode. The special key "#" 220 is the selection key that is pressed in combination with the MP3 button 210, for example, to select the background task setting window.

Figure 3:
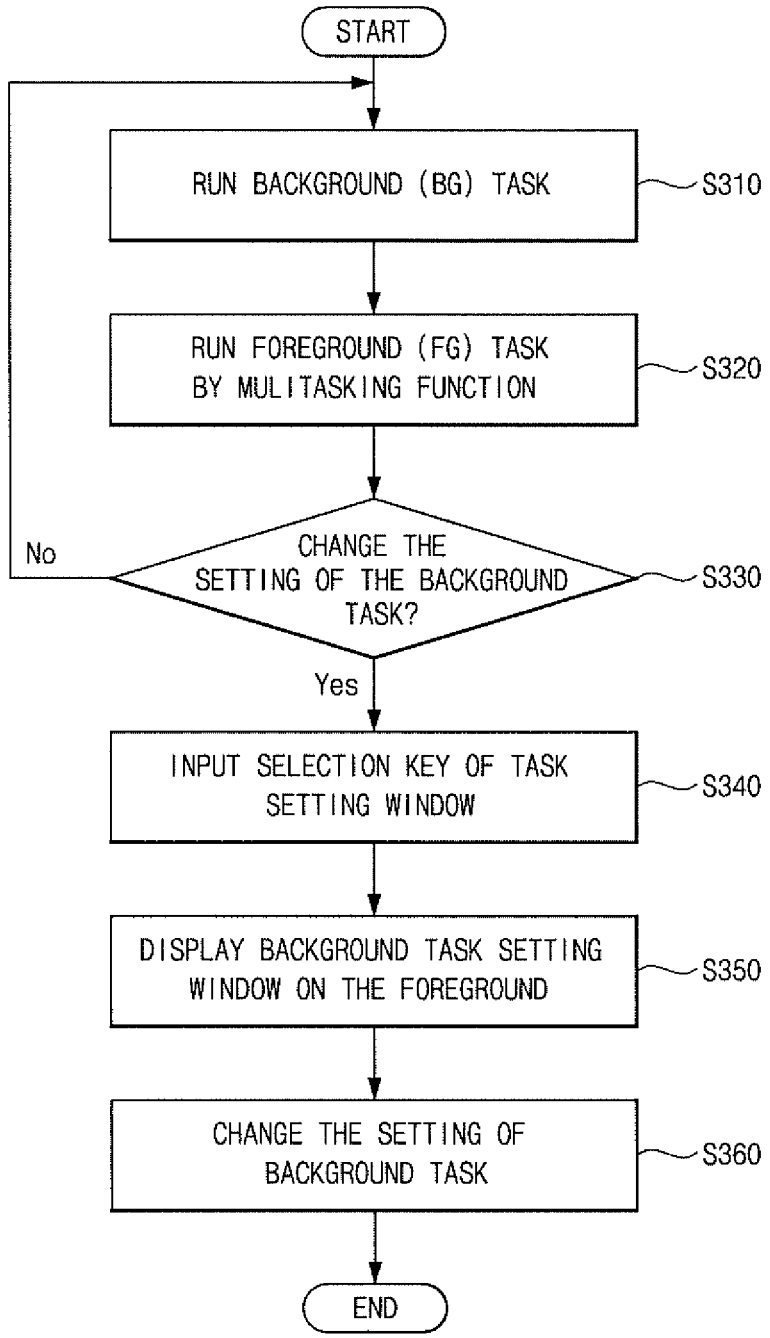
FIG. 3 is a flow chart illustrating a process for controlling the background task of a mobile communication terminal according to an embodiment of the present invention.

FIG. 3 is a flow chart illustrating a process for controlling the background task of a mobile communication terminal 100 according to an embodiment of the present invention. As illustrated in FIG. 3, a background task is run S310 and then a foreground task is run S320.

The background task may be a check of SMS messages, MMS messages and E-mail messages or background music (BGM). The foreground task may be an image viewer, SMS messages, MMS messages, E-mail messages, a WAP browser, a personal information management system, game programs, a wireless Internet connection program or a camera photographing program.

If the user desires to change the setting of the background task S330, a selection key is input to directly call the task setting window for setting a specific operation of the background task S340. Pressing at least two buttons, for example, a function key button and a special key button may perform inputting the selection key. The function key button is a side button key. Pressing a separately set button may also perform inputting the selection key. Inputting the selection key may also be performed using a hot key by pressing the hot key for more than a predetermined time.

The background task setting window is displayed on the foreground upon inputting the selection key S350. The background task setting window may be displayed as a semitransparent window on the foreground screen or as a popup window. A specific operation of the corresponding background task is then set S360.

Figure 4:
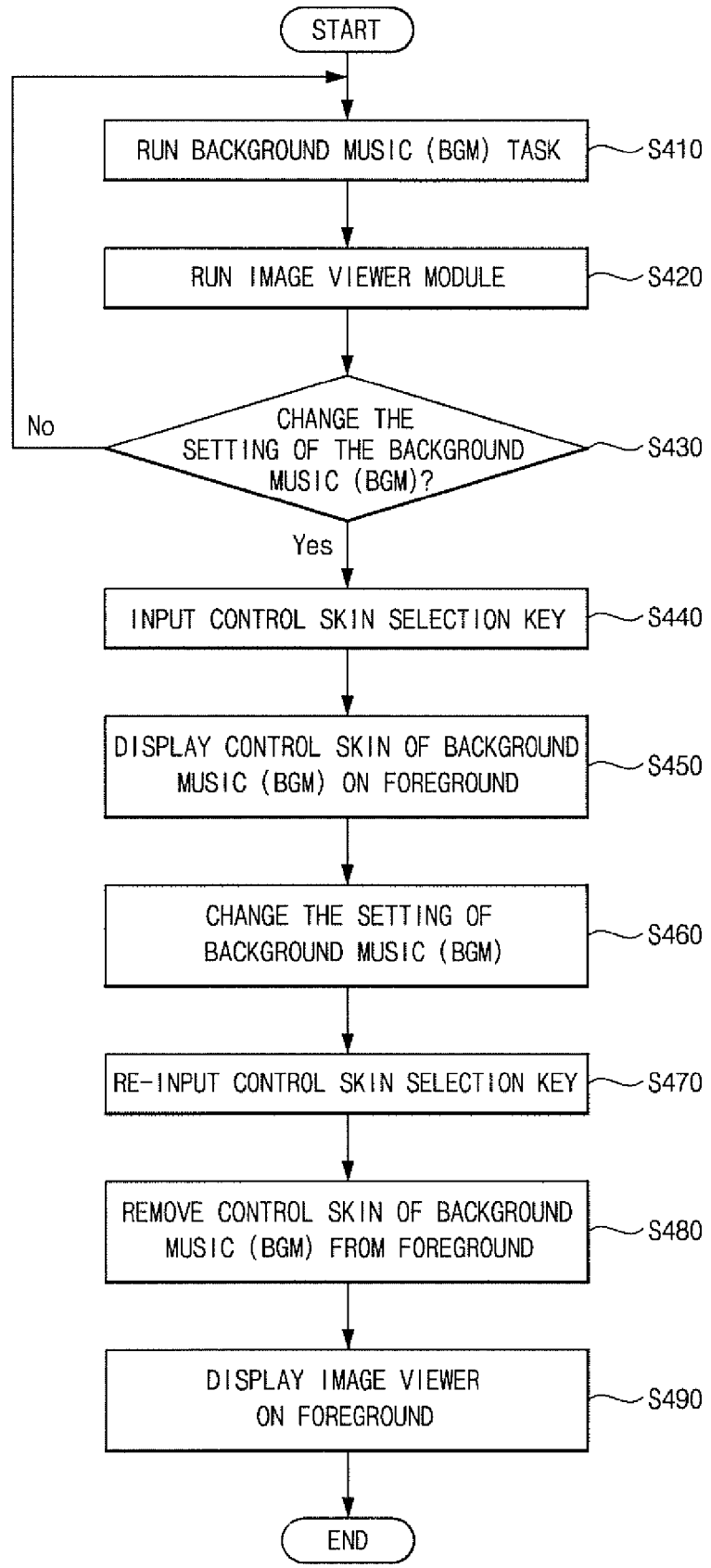
FIG. 4 is a flow chart illustrating a process for controlling background music in a mobile communication terminal according to an embodiment of the present invention.
Figure 5:
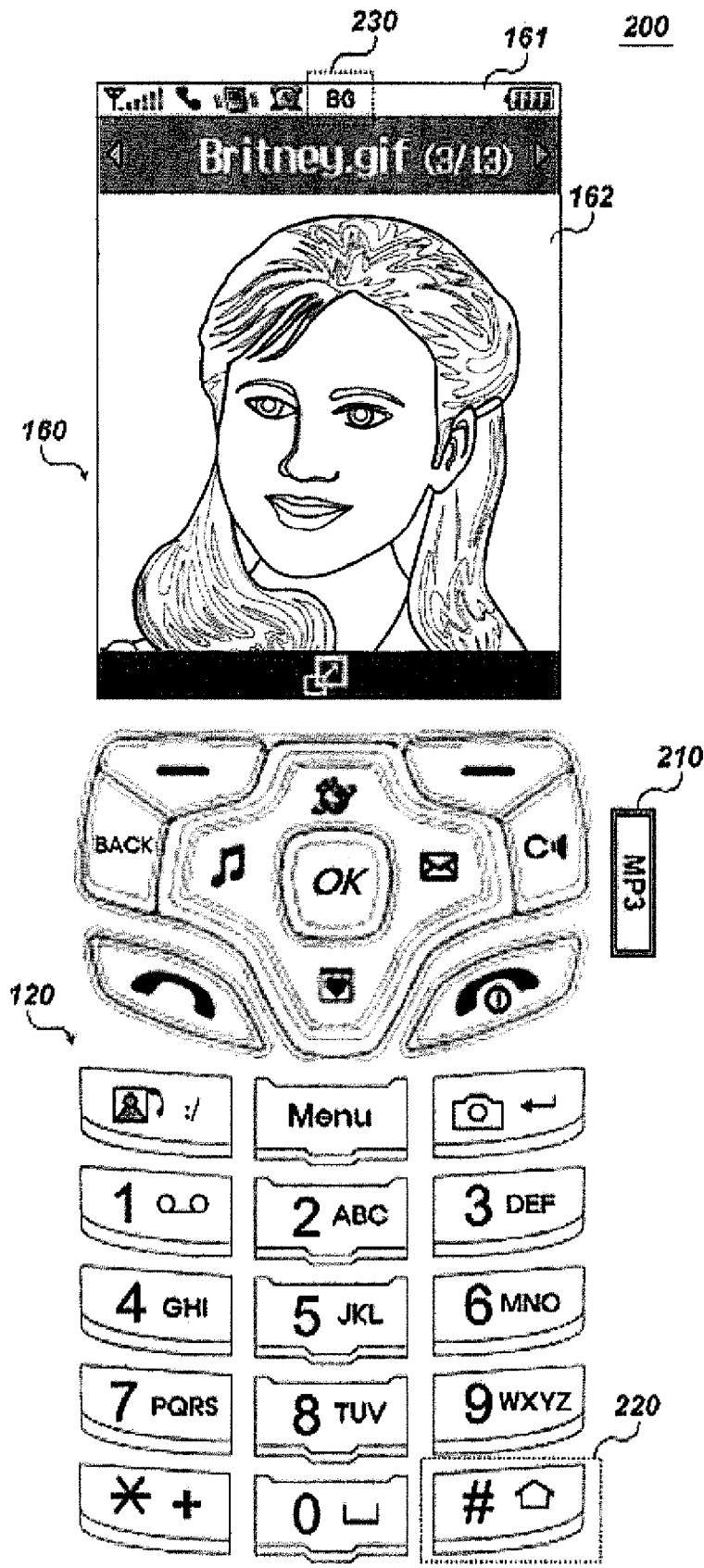
FIG. 5 is a diagram illustrating the external appearance of a mobile communication terminal for controlling background music according to an embodiment of the present invention.
Figure 6A:
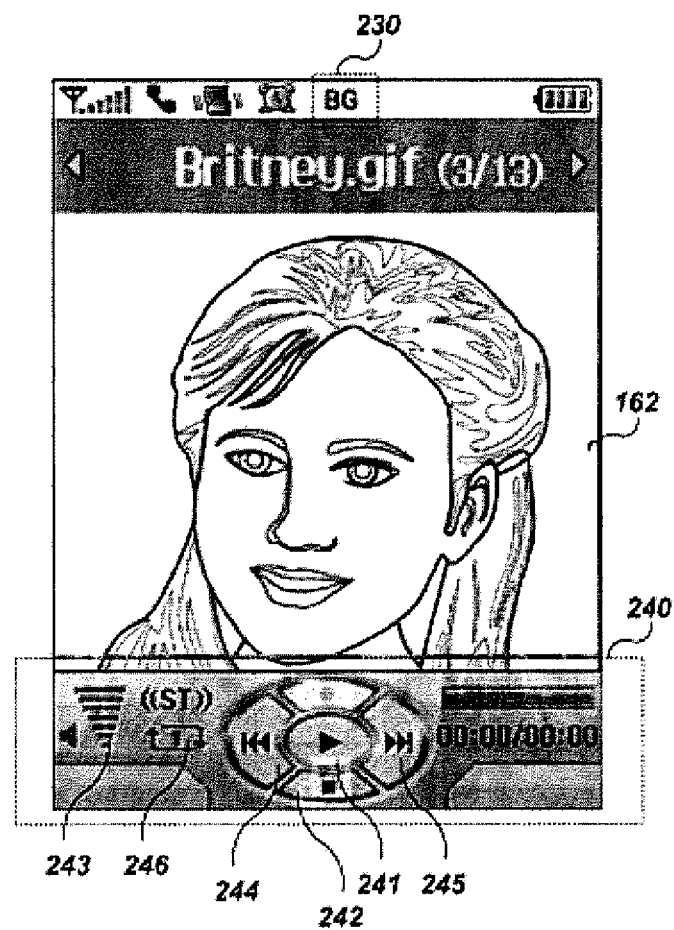
FIGS. 6A and 6B illustrate a display screen that controls the background music in a mobile communication terminal according to an embodiment of the present invention.
Figure 6B:
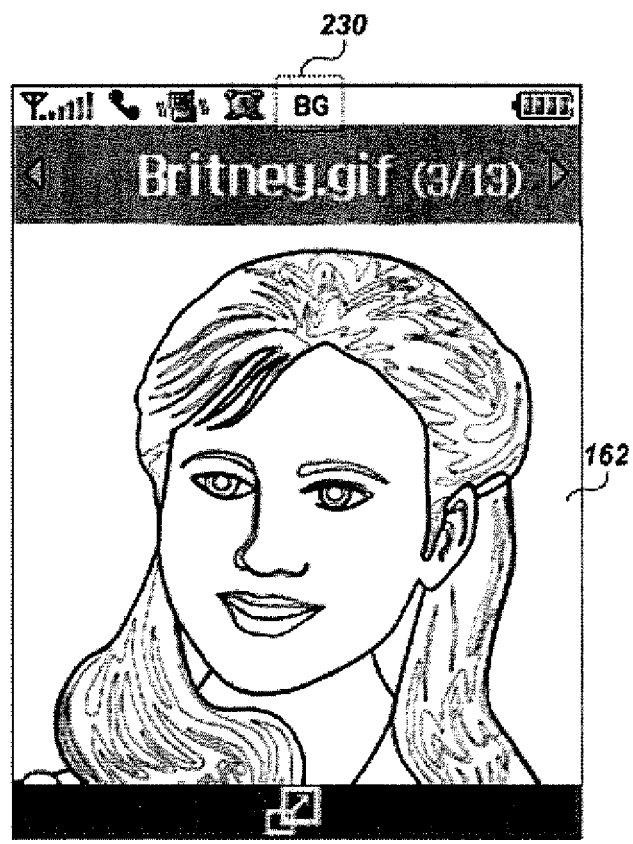

A method for controlling background music in a mobile communication terminal 100 according to an embodiment of the present invention will be explained with reference to FIGS. 4 to 7. FIG. 4 is a flow chart illustrating a process for controlling background music of a mobile communication terminal according to an embodiment of the present invention. FIG. 5 is a diagram illustrating the external appearance of a mobile communication terminal 200 for controlling background music according to an embodiment of the present invention. FIGS. 6A and 6B show a display screen that controls the background music of the mobile communication terminal 200.

First, a background music (BGM) task is run S410. Pressing the MP3 button may enter a background mode.

Next, the multitasking function enables a foreground module, such as an image viewer module S420. The foreground task may be selected from among SMS messages, MMS messages, WAP browsers, PIMS, game programs, wireless Internet connection programs or photographing functions.

As illustrated in FIG. 5, the display 160 displays a status of a battery, receiving strength of a radio wave, a date and time, and an operation mode of the mobile communication terminal 200 on an upper window 161. The display 160 may also visually display information input via the input device 120, information sent through the transceiver 150, or information controlled by the controller 110.

The multitasking function allows a user to run the foreground task simultaneously while performing the MP3 play function in the background. The display 160 displays an image, such as a "gif" file, on the image viewer as the foreground task and simultaneously displays an icon 230 indicating that the background music is playing.

When the user desires to change the setting of the background music (BGM) S430, a selective key, [#]+[mp3], which directly selects a control skin for setting a specific operation of the background music, is input S440. The control skin that corresponds to the selection key that was input is then displayed on the foreground S450.

The background music setting is then changed S460 using the displayed control skin 240. As illustrated in FIG. 6A, the control skin is displayed as a semitransparent window on the foreground screen. The control skin 240 may also be displayed as a Popup window.

The control skin 240 may enable setting one or more tasks, such as Play 241, Pause 242, Volume Up/Down 243, Fast Forward (FF) 245, Rewind (REW) 244, or Stereo/Mono 246. Once the background music setting is changed using the control skin 240, the selection key, such as [#]+[mp3], is re-input S470.

The control skin is then removed from the foreground S480 as illustrated in FIG. 6B. The foreground task, such as an image viewer, is run on the foreground. The present invention calls the control skin for the background music through one selection key input to perform basic control and change and then returns to an original screen 162 for running the foreground task.

The embodiments of the present invention call the background music to the foreground using one key input operation. When a semi-transparent player control skin is displayed, the user detects that the foreground process is running. Alternatively, the user detects the control skin as a Popup menu.

After using the player control skin, when the "MP3" key is again pressed together with the "#" key, the player control skin is returned to the background and a previously used process is brought to the foreground. The user detects the disappearance of the Popup window or semi-transparent control skin and can continue to utilize the previous process.

The present invention also provides a mobile communication terminal and a method for controlling a background task that can increase user convenience by simply controlling the background task. The present invention also provides a mobile communication terminal and a method for controlling a background task in a mobile communication terminal that can improve a multitasking function.

The embodiments of the present invention have been described for illustrative purposes, and those skilled in the art will appreciate that various modifications, additions and substitutions are possible without departing from the scope of the present invention should be defined by the appended claims and their legal equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a background task in a mobile communication terminal, the method comprising:
 performing a foreground task and the background task in a multitasking environment;
 displaying a foreground graphical user interface (GUI) that corresponds to the foreground task in a display area of a display of the mobile communication terminal, wherein the foreground GUI is displayed without displaying a background GUI corresponding to the background task;
 receiving input of a preset physical button, while displaying the foreground GUI, wherein the received input of the preset physical button displays a background control skin;
 displaying the background control skin on a portion of the display area of the foreground GUI, wherein the background control skin includes at least one control key assigned to control at least one operation of the background task;
 receiving input for selecting the at least one control key to control the at least one operation of the background task, while maintaining the displaying of the background control skin;
 executing the at least one operation of the background task according to the received input for selecting the at least one control key, while maintaining the displaying of the background control skin;
 receiving input from the preset physical button, wherein the received input from the preset physical button terminates the displaying of the background control skin; and
 displaying the foreground GUI without displaying the background control skin, while performing the background task, in response to the received input from the preset physical button;
 wherein the background control skin is a GUI different from the background GUI.

2. The method of claim 1, wherein the background task is background music (BGM) and checking short message service (SMS) messages, multimedia messaging service (MMS) messages, or E-mail messages.

3. The method of claim 1, wherein the foreground task is at least an image viewer, short message service (SMS) messages, multimedia messaging service (MMS) messages, E-mail messages, a wireless application protocol (WAP) browser, a personal information management system (PIMS), a game program, a wireless Internet connection program, or a camera photographing program.

4. The method of claim 1, further comprising removing the background control skin from the foreground GUI, upon completion of executing the at least one operation of the background task, when a second input of the preset physical button is received.

5. The method of claim 1, wherein receiving input of the preset physical button further includes receiving input of at least two buttons at the same time.

6. The method of claim 5, wherein one of the at least two buttons is a function key button and one of the at least two buttons is a special key button.

7. The method of claim 6, wherein the function key button comprises a side button key.

8. The method of claim 1, wherein receiving input of the preset physical button further includes receiving input of a specific single button.

9. The method of claim 1, wherein receiving input of the preset physical button further includes receiving input of a hot key for more than a predetermined time.

10. The method of claim 1, wherein displaying the background control skin further includes displaying a semi-transparent window on the foreground GUI.

11. The method of claim 1, wherein displaying the background control skin further includes displaying a popup window on the foreground GUI.

12. The method of claim 1, wherein:
the background control skin is displayed as a popup window;
the background GUI includes a plurality of functions related to the background task; and
the background control skin includes only a portion of the plurality of functions related to the background task.

13. The method of claim 1, wherein another function different from the function of displaying the background control skin is assigned to the preset physical button.

14. A method for controlling music background music in a mobile communication terminal, the method comprising:
performing a first application and a second application in a multitasking environment, wherein the second application relates to music;
displaying a first graphical user interface (GUI) that corresponds to the first application within an entire portion of a display area of a display of the mobile communication terminal, wherein no displayed interface of the first GUI permits displaying of a control skin that relates to the music of the second application;
displaying the control skin on the display in response to a specific input, wherein the specific input is directly associated with the control skin, wherein the control skin is displayed at only a partial portion of the display area at which the first GUI is displayed to permit displaying of only a partial portion of the first GUI to occur simultaneously with the displaying of the control skin, wherein the control skin comprises a plurality of items individually associated with a function for providing the music of the second application;
causing music output according to a function associated with an item selected via the displayed control skin, wherein the causing of the music output occurs while maintaining the displaying of the control skin;
displaying the first GUI at the entire portion of the display area, and terminating the displaying of the control skin, in response to a further input; and
continuing the causing of the music output while displaying the first GUI at the entire portion of the display area.

15. The method of claim 14, wherein the first application is at least an image viewer, short message service (SMS) messages, multimedia messaging service (MMS) messages, E-mail messages, a wireless application protocol (WAP) browser, a personal information management system (PIMS), a game program, a wireless internet connection program or a camera photographing program.

16. The method of claim 14, wherein the displaying the control skin further includes displaying a semi-transparent window on the first GUI.

17. The method of claim 14, wherein the displaying the control skin further includes displaying a popup window on the first GUI.

18. The method of claim 14, wherein the plurality of items of the control skin include a Pause function, a Fast Forward (FF) function, a Rewind (REW) function, and a Volume function.

19. A mobile communication terminal configured to control a background task, the terminal comprising:
a display configured to display information;
an input device configured to receive input of via a preset physical button for displaying a background control skin; and
a controller configured to:
perform the background task in a multitasking environment in which a foreground task is performed;
cause the display to display a foreground graphical user interface (GUI) corresponding to the foreground task without displaying a background (GUI) corresponding to the background task;
cause the display to display the background control skin on a portion of the foreground GUI, when input of the preset physical button is received while the foreground GUI is displayed, wherein the background control skin includes at least one control key assigned to control at least one operation of the background task;
execute the at least one operation of the background task when input for selecting the at least one control key is received while the displayed background control skin is maintained; and
cause the display to display the foreground GUI without displaying the background control skin while the background task is performed, when input of the preset physical button is received;
wherein the background control skin is a GUI being different from the background GUI.

20. The mobile communication terminal of claim 19, wherein the background task is background music (BGM) and checking short message service (SMS) messages, multimedia messaging service (MMS) messages or E-mail messages.

21. The mobile communication terminal of claim 19, wherein the foreground task is an image viewer, short message service (SMS) messages, multimedia messaging service (MMS) messages, E-mail messages, a wireless application protocol (WAP) browser, a personal information management system (PIMS), a game program, a wireless Internet connection program or a camera photographing program.

22. The mobile communication terminal of claim 19, wherein the controller is further configured to cause the display to remove the background control skin from the foreground GUI, upon completion the execution of the at least one operation of the background task, when a second input of the preset physical button is received.

23. The mobile communication terminal of claim 19, wherein the input device is further configured to recognize input of the preset physical button upon at least two buttons of the input device being pressed at the same time.

24. The mobile communication terminal of claim 23, wherein one of the at least two buttons is a function key button and one of the at least two buttons is a special key button.

25. The mobile communication terminal of claim 24, wherein the function button comprises a side button key.

26. The mobile communication terminal of claim 19, wherein the input device is further configured to recognize the input of the preset physical button, when a hot key of the input device is pressed for more than a predetermined time.

27. The mobile communication terminal of claim 19, wherein the controller is further configured to cause the display to display the background control skin as a semi-transparent window on the foreground.

28. The mobile communication terminal of claim 19, wherein the controller is further configured to cause the display to display the background control skin as a popup window on the foreground GUI.

29. The mobile communication terminal of claim 19, wherein:
the background control skin is displayed on the display as a popup window;
the background GUI includes a plurality of functions related to the background task;

the background control skin includes only a portion of the plurality of functions related to the background task; and a graphical configuration of the background control skin is different from a graphical configuration of the foreground GUI.

30. The mobile communication terminal of claim 19, wherein another function different from the function of displaying the background control skin is assigned to the preset physical button.

\* \* \* \* \*